United States Patent [19]  [11]  4,136,134
Plaisted  [45]  Jan. 23, 1979

[54] FAST ACTING POLYESTER ADHESIVE SYSTEMS AND METHOD OF USE
[75] Inventor: Anthony C. Plaisted, North Royalton, Ohio
[73] Assignee: Celtite, Inc., Cleveland, Ohio
[21] Appl. No.: 773,084
[22] Filed: Feb. 28, 1977
[51] Int. Cl.² .......................... C08L 67/06; C09J 3/16
[52] U.S. Cl. .................................... 260/861; 156/332; 206/219; 206/813; 252/426; 252/428
[58] Field of Search ........................... 260/861, 610 D; 252/426; 206/219, 813; 156/332

[56] References Cited
U.S. PATENT DOCUMENTS 2,858,280  10/1958  Maltha .................................. 252/426
3,290,257  12/1966  Bader et al. .......................... 252/426
3,756,388   9/1973  Murphy ................................ 206/219

Primary Examiner—Allan Lieberman
Attorney, Agent, or Firm—Caesar, Rivise, Bernstein & Cohen, Ltd.

[57] ABSTRACT

Fast acting polyester adhesive systems and method of use comprising in a polyester resin cartridge a resin and a catalyst, the improvement lying in replacing the presently used benzoyl peroxide catalyst with a catalyst mixture comprised of benzoyl peroxide and a halogen substituted benzoyl peroxide. The adhesive systems of this invention are utilized in a method of installation of resin bonded rock bolts in mining operations, particularly in cold climates, where speed of installation and reinforcement is essential.

6 Claims, No Drawings

FAST ACTING POLYESTER ADHESIVE SYSTEMS AND METHOD OF USE

This invention relates to fast acting polyester adhesive systems and method of use and in particular relates to a new and improved polyester cartridge catalyst as set forth hereinafter.

There are presently in wide use polyester resin cartridges in the mining and other industries of various purposes including the installation of resin bonded rock bolts where speed of reinforcement is essential. It is known that in cold climates the reaction time between the resin and the catalyst is slowed and in many instances is excessively long. Under present practice it is the usual experience for a resin cartridge to have a gel time ranging from thirty (30) seconds to two (2) minutes which can be intolerably long.

The presently available cartridges are exemplified by Fourcade et al U.S. Pat. No. 3,731,791 and Rausch U.S. Pat. No. 3,915,297, the disclosures of which are incorporated herein for all purposes.

While the aforesaid cartridges normally work well in most applications, nevertheless in cold climates and with the installation of resin bonded rock bolts the presently available waiting period of thirty (30) seconds to two (2) minutes is unsatisfactory and must be shortened.

It is accordingly an object of the present invention to provide fast acting polyester adhesive systems and method of use wherein the reaction time are halved or improved even further.

Yet another object of the present invention is to provide fast action polyester adhesive systems and method of use which have lengthy shelf life, but which are extremely fast acting when called into use.

The foregoing objects as well as other objects of this invention are achieved by providing an improvement wherein the presently used benzoyl peroxide catalyst is replaced by a catalyst mixture comprised of benzoyl peroxide and a halogen substituted peroxide. This mixture of catalyst and the unique results obtaining therefrom, is quite surprising in view of the fact that the halogen substituted benzoyl peroxides by themselves are not particularly rapid catalysts, with the combination of the presently used unsubstituted benzoyl peroxide and a halogen substituted benzoyl peroxide catalyst achieving tremendously rapid gelling, although having substantially long shelf life. This is in contradistinction to attempt to improve the reaction rate of the resin by incorporation therein of promotors which while effective, greatly shorten the shelf life of the resin.

Another remarkable feature of the present invention is that the reaction rate is substantially not slowed down in the temperature range of 75° F. to 30° F.

By virtue of the foregoing invention there is provided a cartridge which has been demonstrated to fulfill the need for a self-setting composition which will secure an anchor bolt in a rock or mine wall at a speed comparable to that required to install a mechanical bolt.

The resins used in the cartridges of this invention consist of solutions of unsaturated polyester resins in ethylenically unsaturated monomers, such as styrene or vinyl toluene, methyl methacrylate, etc. or mixtures of these materials. Suitable inhibitors are also included in the mixture such as tertiary butyl catechol or hydroquinone, together with promotors, such as tertiary amines e.g. dimethyl aniline or dimethyl-p-toluidine. Inorganic fillers may also be incorporated into the resins to the extent of from 30% to 90%, preferable 70% to 80%, e.g. calcium carbonate, silica sand, talc, calcium sulphate, etc.

Catalyst pastes used heretofore, consist of benzoyl peroxide dispersed in a suitable plasticizer, such as dimethyl phthalate together with or without a filler, such as dolomite. The concentration of benzoyl peroxide is preferably in the range of 20% to 30%.

Cartridges are made by extrusion methods as described in U.S. Pat. No. 3,731,791 May, 1973 (Fourcade) with a resin mastic to catalyst paste ratio of 15:1. Such compositions to date may have gel times ranging from 30 minutes down to 30 seconds at 70° F.

The novelty of the invention rests in the combination in paste form of two (2) peroxides, namely (a) benzoyl peroxide and (b) halogen substituted benzoyl peroxide. For example, 2,4, dichloro benzoyl peroxide at a concentration of from 1% to 15% of the total paste formulation is quite effective. It is contemplated that the halogen substituted benzoyl peroxide will include any operative compound of this general class including mono substituted compounds, such as parachloro benzol peroxide or at other positions or disubstituted compounds or of even greater saturation.

Reaction of this foregoing catalyst blend with a highly promoted ortho phthalic polyester resin results in significantly faster gel times which in some cases are over ten (10) times the original reaction rate. Such highly promoted resins are well known in the art, as described above.

This increased speed of reaction was entirely unexpected since the reaction of paste (2) alone, at a benzoyl peroxide content of 20% to 30% and a ratio of 15:1 results in a gel time of not less than 30 seconds at 70° F. Whereas, the reaction of paste (b) alone, at the same peroxide level and same ratio results in incomplete polymerization with the resin forming no more than a soft gel at 70° F.

From the foregoing it will be appreciated that a minor amount 2,4, dichloro benzoyl peroxide when combined with unsubstituted benzoyl peroxide achieves a synergistic result. This effect was completely unexpected since 2,4, dichloro benzoyl peroxide is normally used by those skilled in the art as a peroxide initiator in elevated temperatures in the polymerization of acrylic syrups and polyester resins, specifically in the continuous hot air vulcanization of silicone elastomers.

The mono-chloro derivative is quite effective in accelerating the reaction rate of the benzoyl peroxide paste in a similar concentration of from 1% to 15% of the total paste formulation.

The following examples serve to illustrate the improved reactivity of the combined pastes without necessarily restricting the scope of their application in the polymerization of unsaturated polyester systems.

The unsaturated polyester resin based systems catalyzed with benzoyl peroxide pastes of the above invention may be formulated within the following limits:

|  | Percent by Weight |
|---|---|
| 70% Unsaturated Polyester Resin | 10 – 70 |
| Inorganic Filler | 30 – 90 |
| Dimethyl Aniline | 0.1 – 0.5 |
| Thixotropic Additives | 0 – 3 |
| Benzoyl Peroxide Paste Blend (23.5% Benzoyl Peroxide) | 5 – 10 |

The benzoyl peroxide paste blends are prepared by dispersing the organic peroxide and some inorganic fillers in suitable inert plasticizers such as chlorinated paraffins, castor oil, phthalate esters, etc.

Examples of specific formulations of the peroxide catalyst are as follows:

| Example A | Percent by Weight |
|---|---|
| Benzoyl Peroxide (55% in Butyl Benzoyl Phthalate) | 34.5 |
| 2,4, Dichloro benzoyl Peroxide (50% in Dibutyl Phthalate) | 10.0 |
| Castor Oil | 15.5 |
| Limestone Filler (300 mesh) | 40.0 |
| | 100.0 |

| Example B | Percent by Weight |
|---|---|
| Benzoyl Peroxide (55% in Butyl Benzyl Phthalate) | 34.4 |
| 2,4, Dichloro Benzoyl Peroxide (50% in Dibutyl Phthalate) | 10.0 |
| Dioctyl Adipate | 55.5 |
| | 100.0 |

| Example C (a prior art formulation) | Percent by Weight |
|---|---|
| Benzoyl Peroxide (55% in Butyl Benzoyl Phthalate) | 43.4 |
| Castor Oil | 16.6 |
| Limestone Filler (300 mesh) | 40.0 |
| | 100.0 |

TABLE 1

| Highly Promoted Unsaturated Polyester Mastic (Formulated as above) | BPO Paste | Temperature | Gel Time |
|---|---|---|---|
| 100g | 7g Paste A | 68° F | 12 secs |
| 100g | 7g Paste A | 20° F | 32 secs |
| 100g | 7g Paste A | −10° F | 90 secs |
| 100g | 7g Paste C | 68° F | 36 secs |
| 100g | 7g Paste C | 20° F | 480 secs |
| 100g | 7g Paste C | −10° F | No gel formed after 30 Minutes |

TABLE 2

| Moderately Promoted Unsaturated Polyester Mastic (Formulated as above) | BPO Paste | Temperature | Gel Time |
|---|---|---|---|
| 100g | 7g Paste A | 70° F | 105 secs |
| 100g | 7g Paste A | 60° F | 220 secs |
| 100g | 7g Paste C | 70° F | 1500 secs |
| 100g | 7g Paste C | 60° F | 2400 secs |

With reference to the preferred peroxide paste, this is made up from BPO powder together with a plasticizer system consisting of polypropylene glycol of molecular weight 400–450 and/or castor oil. The advantage of such a blend is twofold. (1) control of viscosity, and (2) very low solubility for benzoyl peroxide. A further preference in the paste formulation is for the use of the dihalogen BPO suspended in silicone oil (viscosity 1000 cups) rather than dibutyl phthalate. There would appear to be marked improvements in the paste consistency as well as being a cheaper product.

A typical formulation is:

| | Percent by Weight |
|---|---|
| Benzoyl Peroxide Powder (35% on Dicalcium Phosphate) | 50.5 |
| 2,4, Dichloro Benzoyl Peroxide (50% is Silicone Oil) | 12.0 |
| Polypropylene Glycol (M.W. 400) | 38.0 |
| | 100.0 |

| Example D | Percent by Weight |
|---|---|
| Benzoyl Peroxide (55% in Butyl Benzoyl Phthalate) | 34.5 |
| Para Chloro Benzoyl Peroxide (50% in Dibutyl Phthalate) | 10.0 |
| Dioctyl Adipate | 55.5 |
| | 100.0 |

TABLE 3

| Highly Promoted Unsaturated Polyester Mastic (Formulated as above | BPO Paste | Temperature | Gel Time |
|---|---|---|---|
| 100g | 7g Paste C | 68° F | 16 secs |
| 100g | 7g Paste C | 30° F | 150 secs |
| 100g | 7g Paste D | 68° F | 20 secs |
| 100g | 7g Paste D | 30° F | 60 secs |

As can be seen from Table 1, a major advantage of this invention is the ability to formulate compositions capable of reacting at far lower temperatures than hitherto found practical. One limiting factor to the production of very fast reacting polyester systems for these applications is the instability of the highly promoted unsaturated polyester resin. This instability imposes a storage life limitations on the product. The new invention allows the use of a less highly promoted polyester system having extended shelf life together with increased speed of reaction. This is particularly important in the application of resin bonded rock bolts in mining operations in cold climates, where speed of reinforcement is essential. In such operations at normal ambient temperatures, it is usual to use resin cartridges having gel time ranging from 30 seconds to two (2) minutes.

Cartridges were made with the above composition using techniques as disclosed in U.S. Pat. No. 3,731,791. Size of cartridges are 22mm diameter, and 12" long. An overhead hole 25mm in diameter and four feet (4') long was drilled into a shale/coal matrix and one of the above cartridges was inserted to the back of the hole. A six foot (6') length of ⅞" rebar attached to a drill was then spun into the cartridge at 500 rpm. The rebar bolt was fully home to the back of the hole in 10 seconds and the rotation discontinued. The very rapid reaction allowed the bolt to be fully supported within 20 seconds. After only two (2) minutes, a hydraulic tensioning device was attached to the free end of the bolt and a direct tensile load applied at a rate of one (1) ton every 15 seconds. The resin/rock interface yielded at 12 tons tensile load, which was considered more than adequate for that time interval from bolt insertion.

Without further elaboration, the foregoing will so fully illustrate my invention that others may, be applying current or future knowledge, readily adapt the same for use under various conditions of service.

What is claimed as the invention is:

1. A fast acting polyester adhesive system including solutions of unsaturated polyester resin in ethylenically unsaturated monomers and a catalyst paste therefor, the improvement being in providing as said catalyst paste the combination of an unsubstituted benzoyl peroxide, a halogen substituted benzoyl peroxide and a major amount of filler and plasticizer for said polyester, said halogen substituted benzoyl peroxide being selected from the group consisting of 2,4 dichloro benzoyl peroxide, and parachloro benzoyl peroxide, said halogen substituted benzoyl peroxide being present in said paste in an amount by weight of from 1 to 15% and said unsubstituted benzoyl peroxide being present in said paste in an amount greater than said substituted benzoyl peroxide.

2. The System of claim 1 wherein said halogen substituted benzoyl peroxide is 2,4 dichloro benzoyl peroxide.

3. The System of claim 1 wherein said peroxide is parachloro benzoyl peroxide.

4. A method of achieving a bond in a very quick manner which comprises using a fast acting polyester adhesive system, including solutions of unsaturated polyester resin in ethylenically unsaturated monomers and a catalyst paste therefor, the improvement being in providing as said catalyst paste the combination of an unsubstituted benzoyl peroxide, a halogen substituted benzoyl peroxide and a major amount of filler and plasticizer for said polyester, said halogen substituted benzoyl peroxide being selected from the group consisting of 2,4 dichloro benzoyl peroxide, and parachloro benzoyl peroxide, said halogen substituted benzoyl peroxide being present in said paste in an amount by weight of from 1 to 15% and said unsubstituted benzoyl peroxide being present in said paste in an amount greater than said substituted benzoyl peroxide, and imposing a mixing action to combine said polyester and said catalyst paste in order to achieve a bond.

5. The method of claim 4 wherein said halogen substituted benzoyl peroxide is 2,4 dichloro benzoyl peroxide.

6. The method of claim 4 wherein said peroxide is parachloro benzoyl peroxide.

* * * * *